(12) United States Patent
Barbosa et al.

(10) Patent No.: US 9,081,760 B2
(45) Date of Patent: Jul. 14, 2015

(54) SYSTEM AND METHOD FOR BUILDING DIVERSE LANGUAGE MODELS

(75) Inventors: Luciano De Andrade Barbosa, Madison, NJ (US); Srinivas Bangalore, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 721 days.

(21) Appl. No.: 13/042,890

(22) Filed: Mar. 8, 2011

(65) Prior Publication Data

US 2012/0232885 A1    Sep. 13, 2012

(51) Int. Cl.
| | |
|---|---|
| G06F 17/21 | (2006.01) |
| G06F 17/27 | (2006.01) |
| G06F 17/28 | (2006.01) |
| G10L 15/06 | (2013.01) |

(52) U.S. Cl.
CPC ............ *G06F 17/2715* (2013.01); *G06F 17/27* (2013.01); *G06F 17/2735* (2013.01); *G06F 17/28* (2013.01); *G06F 17/21* (2013.01); *G10L 2015/0633* (2013.01)

(58) Field of Classification Search
USPC ........................ 704/231, 251, 1, 4, 8–10, 236, 704/243–245, 257, 270–270.01, 277, 704/E11.001–E11.007; 706/15–16, 25, 706/45–61, 62
See application file for complete search history.

(56) References Cited

U.S. PATENT DOCUMENTS

| | | | |
|---|---|---|---|
| 6,094,649 A * | 7/2000 | Bowen et al. ................. 707/711 |
| 6,415,248 B1 * | 7/2002 | Bangalore et al. ................ 704/1 |
| 6,418,431 B1 * | 7/2002 | Mahajan et al. ...................... 1/1 |
| 6,430,551 B1 | 8/2002 | Thelen et al. |
| 6,571,240 B1 * | 5/2003 | Ho et al. ............................... 1/1 |
| 6,615,172 B1 * | 9/2003 | Bennett et al. ................ 704/257 |
| 8,135,575 B1 * | 3/2012 | Dean .................................. 704/7 |
| 8,165,870 B2 * | 4/2012 | Acero et al. .................... 704/10 |
| 8,219,572 B2 * | 7/2012 | Ghosh et al. .................. 707/758 |
| 8,275,604 B2 * | 9/2012 | Jiang et al. ........................ 704/4 |
| 8,666,928 B2 * | 3/2014 | Tunstall-Pedoe ............... 706/55 |
| 8,972,268 B2 * | 3/2015 | Waibel et al. ................. 704/277 |
| 2003/0171910 A1 * | 9/2003 | Abir ................................. 704/1 |
| 2003/0182131 A1 * | 9/2003 | Arnold et al. ................. 704/275 |
| 2004/0034652 A1 * | 2/2004 | Hofmann et al. ............. 707/102 |
| 2005/0289123 A1 * | 12/2005 | Dettinger et al. ................ 707/3 |

(Continued)

OTHER PUBLICATIONS

B. Ballinger;C. Allauzen;A. Gruenstein;J. Schalkwyk, On-Demand Language Model Interpolation for Mobile Speech Input, 2010, Interspeech, pp. 1812-1815.*

(Continued)

*Primary Examiner* — Pierre-Louis Desir
*Assistant Examiner* — David Kovacek

(57) ABSTRACT

Disclosed herein are systems, methods, and non-transitory computer-readable storage media for collecting web data in order to create diverse language models. A system configured to practice the method first crawls, such as via a crawler operating on a computing device, a set of documents in a network of interconnected devices according to a visitation policy, wherein the visitation policy is configured to focus on novelty regions for a current language model built from previous crawling cycles by crawling documents whose vocabulary considered likely to fill gaps in the current language model. A language model from a previous cycle can be used to guide the creation of a language model in the following cycle. The novelty regions can include documents with high perplexity values over the current language model.

19 Claims, 12 Drawing Sheets

(56) References Cited

U.S. PATENT DOCUMENTS

| | | | |
|---|---|---|---|
| 2006/0178869 A1* | 8/2006 | Acero et al. | 704/10 |
| 2006/0212288 A1 | 9/2006 | Sethy et al. | |
| 2008/0091406 A1* | 4/2008 | Baldwin et al. | 704/4 |
| 2009/0182547 A1 | 7/2009 | Niu et al. | |
| 2009/0326947 A1* | 12/2009 | Arnold et al. | 704/257 |
| 2010/0274753 A1* | 10/2010 | Liberty et al. | 706/50 |
| 2011/0172988 A1 | 7/2011 | Wang et al. | |
| 2012/0109624 A1* | 5/2012 | Yang et al. | 704/2 |
| 2012/0232885 A1* | 9/2012 | Barbosa et al. | 704/9 |

OTHER PUBLICATIONS

Ching-Chi Hsua;Fan Wub, Topic-specific crawling on the Web with the measurements of the relevancy context graph, 2006, Information Systems, vol. 31, Issues 4-5, pp. 232-246.*

Aggarwal et al., "Intelligent Crawling on the World Wide Web with Arbitrary Predicates", ACM 1-58113-348-0/01/0005, *WWW10* May 15, 2001, Hong Kong.

Agrawal et al., "Diversifying Search Results", ACM 978-1-60558-390-7, WSDM '09 Barcelona, Spain, 2009.

Ahlers et al., "Adaptive Geospatially Focused Crawling", ACM 978-1-60558-512-3/09/11, CIKM'09, Nov. 2-6, 2009, Hong Kong, China.

Akbani et al., "Applying Support Vector Machines to Imbalanced Datasets", Department of Computer Science, University of Texas at San Antonio, 2004.

Barbosa et al., "Searching for Hidden-Web Databases", Eighth International Workshop on the Web and Databases, Jun. 16-17, 2005, Baltimore, Maryland.

Barbosa et al, "An Adaptive Crawler for Locating Hidden-Web Entry Points", May 8-12, 2007, Banff, Alberta, Canada, ACM 978-1-59593-654-7/07/0005.

Bellegarda, Jerome R., "Statistical language model adaptation: review and perspectives", Speech Communication, vol. 42 pp. 93-108, 2004.

Bulyko et al., "Web Resources for Language Modeling in Conversational Speech Recognition", ACM Transactions on Speech and Language Processing, vol. 5, No. 1, Article 1, Dec. 2007.

Chakrabarti et al., "Accelerated Focused Crawling through Online Relevance Feedback", ACM 1-58113-449-05/02/0005, May 7-11, 2002, Honolulu, Hawaii, USA.

Chakrabarti et al., "Focused crawling: a new approach to topic-specific Web resource discovery", Published by Elsevier Science B.V., 1999.

Clarkson, et al., "Language Model Adaptation Using Mixtures and an Exponentially Decaying Cache", Cambridge University Engineering Department, pp. 799-802, IEEE 1997.

Diligenti et al., "Focused Crawling Using Context Graphs", Proceedings of the 26th International Conference on Very Large Databases, Cairo, Egypt, pp. 527-534, 2000.

Goffin et al., "The AT&T Watson Speech Recognizer", AT&T Labs—Research, 0-7803-8874-7/05, IEEE 2005.

Hall et al., "The WEKA Data Mining Software: An Update", SIGKDD Explorations, vol. 11, Issue 1, pp. 10-18, Jun. 2009.

Huang et al., "Exploring Web Scale Language Models for Search Query Processing", International World Wide Web Conference Committee (IW3C2), ACM 978-1-60558-799-8/10/04, Apr. 26-30, 2010.

Koehn, Philipp, "Europarl: A Parallel Corpus for Statistical Machine Translation", School of Informatics, University of Edinburgh, Scotland, 2005.

Kwok, et al., "Scaling Question Answering to the Web", ACM Transactions on Information Systems, vol. 19, No. 3, Jul. 2001, pp. 242-262.

Munteanu et al., "Web-Based Language Modelling for Automatic Lecture Transcription", In Proceedings of the Tenth European Conference on Speech Communication and Technology—EuroSpeech / Eighth Interspeech, Antwerp, Belgium, Aug. 2007, Apr. 11, 2013.

Olston et al., "Web Crawling", Foundations and Trends in Information Retrieval, vol. 4, No. 3 pp. 175-246, 2010.

Rennie et al., "Using Reinforcement Learning to Spider the Web Efficiently", Published in proceedings of ICML-99 Workshop, Machine Learning in Text Data Analysis, 1999.

Sarikaya et al., "Rapid Language Model Development Using External Resources for New Spoken Dialog Domains", 0-7803-8874-7/05, pp. 573-576 IEEE 2005.

Seiffert et al., "Building Useful Models from Imbalanced Data with Sampling and Boosting", Proceedings of the Twenty-First International FLAIRS Conference, pp. 306-311, 2008.

Stokoe et al., "Word Sense Disambiguation in Information Retrieval Revisited", ACM 1-58113-646-3/03/0007, SIGIR'03, pp. 159-166, Jul. 28-Aug. 1, 2003.

Wang et al., "Efficacy of a Constantly Adaptive Language Modeling Technique for Web-Scale Applications", Internet Service Research Center, Microsoft Research, Microsoft Corporation, Apr. 2009.

Whitelaw et al., "Web-Scale Named Entity Recognition", ACM 978-1-59593-991-3/08/10, CIKM'08, pp. 123-132, Oct. 26-30, 2008.

Zhang, et al., "Time-Sensitive Language Modelling for Online Term Recurrence Prediction", 2009.

* cited by examiner

SYSTEM AND METHOD FOR BUILDING DIVERSE LANGUAGE MODELS

BACKGROUND

1. Technical Field

The present disclosure relates to generating language models (LMs) and more specifically to generating language models based on data gathered by crawling web pages.

2. Introduction

The world wide web is an invaluable data repository. The text data on the web can be harnessed for tasks as diverse as named entity recognition, word sense disambiguation, and machine translation in natural language processing, search and question answering in information retrieval, and pronunciation modeling and language modeling in Speech Recognition.

Text on the web is so attractive for these applications for several reasons. Apart from the sheer size of the textual repository, web text is compelling because it is diverse and not limited to a particular domain. This aspect can be important as language technologies begin to cope with handling open domain input in tasks such as search, question-answering, and language translation. Further, web text, such as news websites, blogs, microblogs and others, is dynamic, and tracks the current news and popular events. For these reasons, recent research has exploited the textual content of the web to create models for natural language tools, in particular, language models.

Typically, language models are built on a training corpus of sentences with the assumption that the distribution of n-grams in the training set is the same as the distribution of n-grams in the task context where the language model would be used. This assumption, also called as the independent and identically distributed (IID) assumption, is reasonable for tasks which are domain limited and where the target data does not change over time. However, in open domain applications such as question-answering, broadcast news speech recognition, where the input to the models change based on the current events, the IID assumption results in a mismatch between the training and target contexts. This mismatch can be interpreted as holes or gaps in the training data. To address this issue, language models are typically transformed to match the target distributions using adaptation techniques.

One approach is focused crawling. Focused crawlers collect web pages in a well-defined topic. For instance, a focused crawler can look for web pages in domains such as astronomy, Linux, cancer, etc. Another focused crawler tries to locate web forms in domains as airfare, hotel, cars, etc. The more pages/forms collected in these domains by these crawlers, the better their policy.

Another approach is language modeling. Language modeling can be applied to three particular problems: query spelling, query bracketing and query segmentation. The anchor language model is more similar to the queries (lower perplexity) than the body of the page and also obtained the best performance in almost all the presented scenarios for these three tasks. One query-based method collects web data to build a language model for spoken dialog domains in combination with an in-domain language model, created from dialogs in the domain. The queries are generated from utterances of dialogs and the resulting pages are cleaned by selecting the sentences in these pages more similar to sentences in the domain. Experiments in the financial transaction domain showed a great reduction in the word error rate by adding the web language model.

Still other methods focus more on the process of building the language model from web data and/or time-sensitive data. For instance, one method adapts the language model as chunks of data are available, as in the scenario of web crawling, while another method builds general-purpose language models by partitioning the data into mixture components giving different weights for these components and by taking into account the recency of the words, recent words having a higher probability of appearing in the future. However, each of these approaches includes significant drawbacks and do not crawl web pages or generate language models in a sufficiently efficient manner.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

This disclosure handles the mismatch problem in open domain applications in a different way. To fill the gaps present in the language model, this approach collects web text whose vocabulary is not well represented in the model, producing a more diverse language model. Unlike a traditional static-corpus driven method where models trained on static corpora would soon be outdated due to the changing profiles of the input, web text based models can be continuously updated to keep them from becoming stale.

The language modeling approach motivates the usage of language models for information retrieval tasks whereas the approach disclosed herein is a solution to produce better language models by building language models from the web to help in the problem of word prediction. The approach of using queries to build language models works well in well-defined and focused domain, however when the goal is to build language models for more general purposes, such as newscasts, a more scalable approach can better handle the limit for the numbers of queries that can be issued to a search engine.

Further, in direct contrast to traditional focused crawling, the approaches set forth herein build a broad-domain language model by avoiding crawling pages which are well represented in previous crawls by exploiting patterns in the links, anchors and around the links to guide the crawler towards regions with pages with high perplexity, and use online learning to change the crawling policy according to some feedback about the quality of the pages current crawled. Online learning is specially important in very dynamic scenarios, such as newscasts, because a policy used in a previous crawling cycle might not have the same effect in the current one.

This approach unfocuses the crawler on previous collected data, from which the language model was originated, and crawls for regions of novelty with respect to the language model. The crawler identifies these regions by using an information theoretic measure, and then guides its visitation policy based on the patterns of links in these regions. Moreover, in the example topic of newscasts, the scope of the crawler is restricted to pages in news web sites. One challenge is to deal with this very dynamic domain wherein new events appear constantly. The crawler can adjust its focus as the crawl progresses, to be able to reflect in its policy the most current state of its environment.

In summary, some features of this approach include (1) a novel crawling strategy that is tightly coupled with the goal of creating diverse language models for newscasts by filling in the gaps in the current language model; (2) use of an information theoretic measure to guide the crawling policy instead of using regular supervised learning techniques; and (3) a combination of techniques from different research communities—NLP, Machine Learning, Information Theory and Information Retrieval—to address the problem of creating a corpus for language models.

Word prediction performed by language models has an important role in many tasks as e.g. word sense disambiguation, speech recognition, hand-writing recognition, query spelling, and query segmentation. The approaches set forth herein provide a new focused crawling strategy to collect web pages in order to create diverse and generic language models in any context. In each crawling cycle, the crawler tries to fill the gaps present in the current language model built from previous cycles, by avoiding visiting pages whose vocabulary is already well represented in the model. The crawler relies on an information theoretic measure to identify these gaps and then learns link patterns to pages in these regions in order to guide its visitation policy.

Disclosed are systems, methods, and non-transitory computer-readable storage media for generating a language model using a diversity crawler. The exemplary system crawls, such as via a crawler operating on a computing device, a set of documents in a network of interconnected devices according to a visitation policy, wherein the visitation policy is configured to focus on novelty regions for a first language model by crawling documents considered likely to fill gaps in the first language model. The documents can be web pages, but can also include other documents, such as word processing documents on a corporate network that contain links to other documents. The links can be contained within the displayed data of the documents or in metadata or other data not typically displayed to users. The system can identify novelty regions using an information theoretic measure. The novelty regions can be based on documents with high perplexity values over the first language model. The system can update the visitation policy for the crawler once a crawling threshold is reached, such as based on an expected perplexity value of documents. The system can determine the expected perplexity value of a page by evaluating links to the page.

The exemplary system parses at least some of the plurality of documents into sentences. The system can trigger parsing based on the completion of a crawling cycle, such as a specific time interval. The examples provided herein are primarily based on a one day crawling cycle, but longer or shorter cycles can be used. Further, the cycles can be of a dynamic duration, so that each cycle is not necessarily of the same duration. The system combines the sentences to yield a second language model. The second language model can be a trigram model built using a language modeling toolkit. The system can merge a set of language models to yield a combined language model.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for generating language models from web based (or other) document collections in an efficient manner. A system, method and non-transitory computer-readable media are disclosed which generate language models and also recognize speech based on the generated language models. A brief introductory description of a basic general purpose system or computing device in FIG. 1 which can be employed to practice the concepts is disclosed herein. A more detailed description of the web crawler, language models, and related approaches and algorithms will then follow.

Disclosed herein is an extensive evaluation of the crawling strategy over real web data. This evaluation demonstrates that this approach produces more effective and diverse language models than the ones created by a baseline crawler. In some cases the crawler returned similar results to the baseline by crawling only 12.5% of the pages collected by the baseline. The results also show that the online learning component is able to improve the crawler's performance by learning the patterns related to the gaps in the language model, even when fewer gaps remain in the language model after some crawling cycles.

The disclosure discusses concepts of a language model and explains the need for diversification of a language model, then presents the main components for crawling in greater detail. Finally, the disclosure discusses experimental results. These variations shall be discussed herein as the various embodiments are set forth. The disclosure now turns to FIG. 1.

Figure 1:
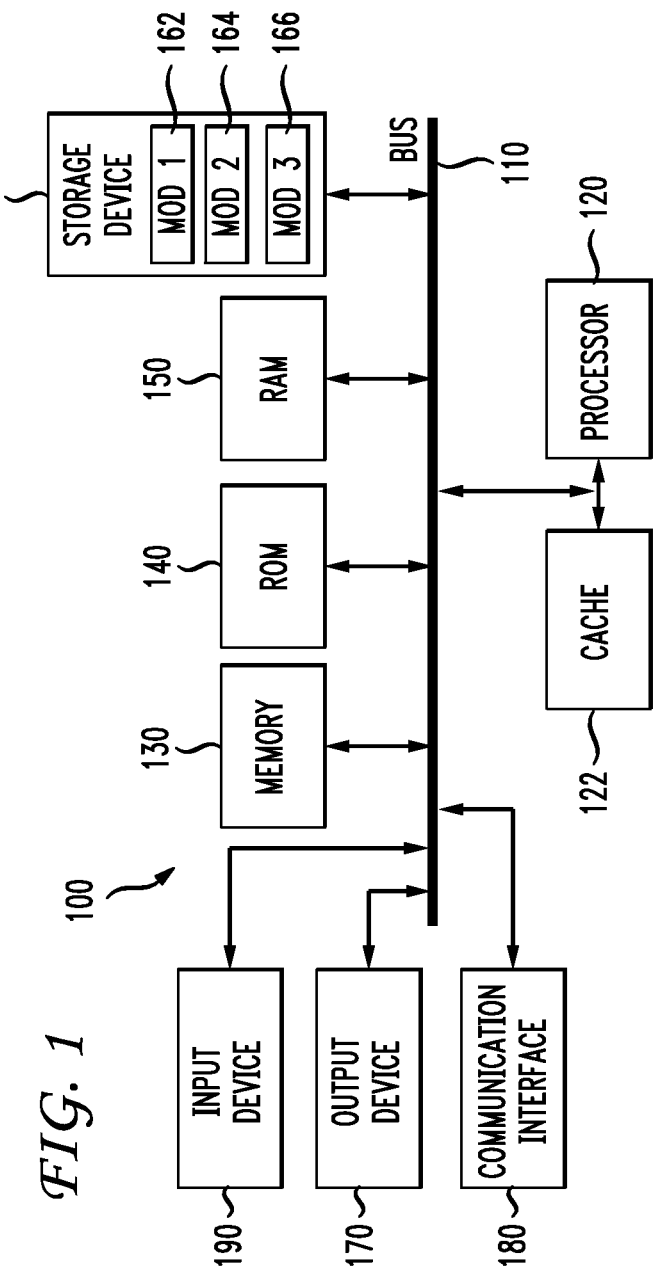
FIG. 1 illustrates an example system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache of high speed memory connected directly with, in close proximity to, or integrated as part of the processor 120. The system 100 copies data from the memory 130 and/or the storage device 160 to the cache for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer readable storage media provide nonvolatile storage of computer readable instructions, data structures, program modules and other data for the computing device 100. In one aspect, a hardware module that performs a particular function includes the software component stored in a non-transitory computer-readable medium in connection with the necessary hardware components, such as the processor 120, bus 110, display 170, and so forth, to carry out the function. The basic components are known to those of skill in the art and appropriate variations are contemplated depending on the type of device, such as whether the device 100 is a small, handheld computing device, a desktop computer, or a computer server.

Although the exemplary embodiment described herein employs the hard disk 160, it should be appreciated by those skilled in the art that other types of computer readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Non-transitory computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations discussed below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited non-transitory computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored as would be known in the art in other computer-readable memory locations.

Having disclosed some components of a computing system, the disclosure now returns to a discussion of language models and web crawlers. A web crawler is a computer program that browses a series of interconnected web documents in an automated fashion, such as by following links contained in one document that point to other documents. For instance, the web crawler can start with one or more "seed" documents, parse the seed document(s) for links to other documents, store those links in a crawling queue, table, or database. As the web crawler processes each other document, it parses links to yet additional documents, which are in turn added to the crawling queue, table, or database. The web crawler can continue until a desired information or other threshold is met, until all the links in the crawling queue are exhausted, for a particular duration of time, up to a particular link depth, or based on some other measure and/or event. The web crawler disclosed herein can be tightly coupled with the goal of creating diverse language models for a particular domain by filling in the gaps in the current language model. Further, use of an information theoretic measure to guide the crawling policy instead of using regular supervised learning techniques. The problem of creating a corpus for language models can be accomplished via the combination of techniques from different research communities, such as natural language processing, machine learning, information theory and information retrieval.

The disclosure turns now to a discussion of language models. Many speech and language applications need a mechanism to rank sentences according to their well-formedness based on the grammar of a language. However, designing such a ranking function is difficult and has eluded researchers for many years. Instead, the likelihood of a sentence (denoted as P(W), where W is a sentence) in a corpus of text is used an approximation for grammatically, with the assumption that grammatically well-formed sentences occur more often than ungrammatical ones. However, due to sparseness concerns, the probability of the joint event $W=w_1, w_2, \ldots, w_m$ is approximated using an independence assumption as shown in Equation 2, below, also known as an n-gram model:

$$P(W) = \prod_{i=1}^{m} P(w_i \mid w_1, \ldots, w_{i-n+1}) \quad (1)$$

$$P(W) = \prod_{i=1}^{m} P(w_i \mid w_{i-1}, \ldots, w_{i-n+1}) \quad (2)$$

The individual probabilities in the product are computed using maximum likelihood estimation from a corpus of word sequences, and when a given n-gram is not observed in the corpus, then its probability is estimated using a lower order n-1 gram.

Besides evaluating the effectiveness of a language model in the context of a task, such as machine translation or speech recognition, Perplexity is one metric to compare language models independent of the task. As seen in Equation 2, an n-gram model can be viewed as a model for predicting the nth word given the preceding n-1 words of history. Perplexity measures the average number of word choices available at each position of a word sequence according to the language model. Low perplexity implies a better fit of the model for the word sequence. Perplexity of a language model P on an m-word sequence W is defined in Equation 3, below:

$$\text{Perplexity}(P, W) = P(W)^{-\frac{1}{m}} \quad (3)$$

$$\text{Perplexity}(P, W) = \sqrt[m]{\prod_{i=1}^{m} \frac{1}{P(w_i \mid w_{i-1}, \ldots, w_{i-n+1})}} \quad (4)$$

Figure 2:
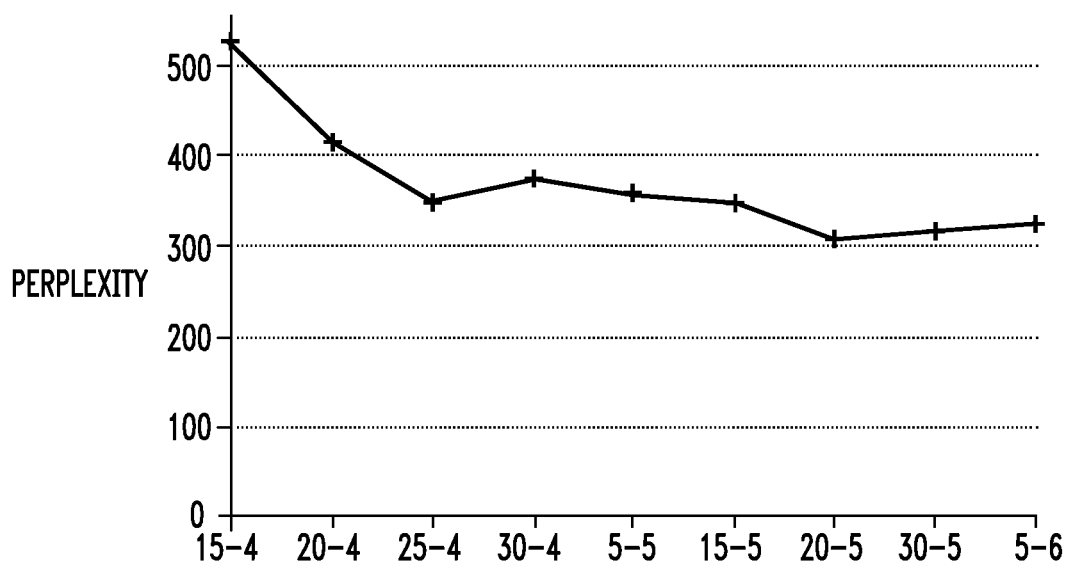
FIG. 2 illustrates an example perplexity of a news story over language models created from news websites.

The perplexity of a fixed page evolving over different language models built over time can provide some insight into perplexity and how perplexity can be associated with time. FIG. 2 illustrates the perplexity of a news story from May 20, 2010 over language models created from news websites between April 15th and June 6th. The closer the language model is to the story, the smaller the perplexity. In fact, the lowest value is on the day that the story was released and the perplexity increases again afterwards. The vocabulary of pages that have high perplexity over a language model represent the gaps on it. A diversity crawler can exploit this feature.

A crawling strategy that prioritizes diversity can make crawling to create a language model more efficient. In order to prioritize diversity, the crawler searches for web regions where the vocabulary of the pages is poorly covered by previous crawls. Each crawling cycle is defined as a specific time interval, such as one day, six hours, two weeks, or some other static or dynamic time interval. Thus, the current cycle's crawl will be guided based on the language model created from previous cycle's crawls. Pages whose vocabulary is well-covered on the language model contain some common patterns in their links. These patterns will then guide the link visitation of the current cycle's crawl to avoid collecting similar pages and to focus on pages that are likely to have information that will fill gaps in the language model.

Figure 3:
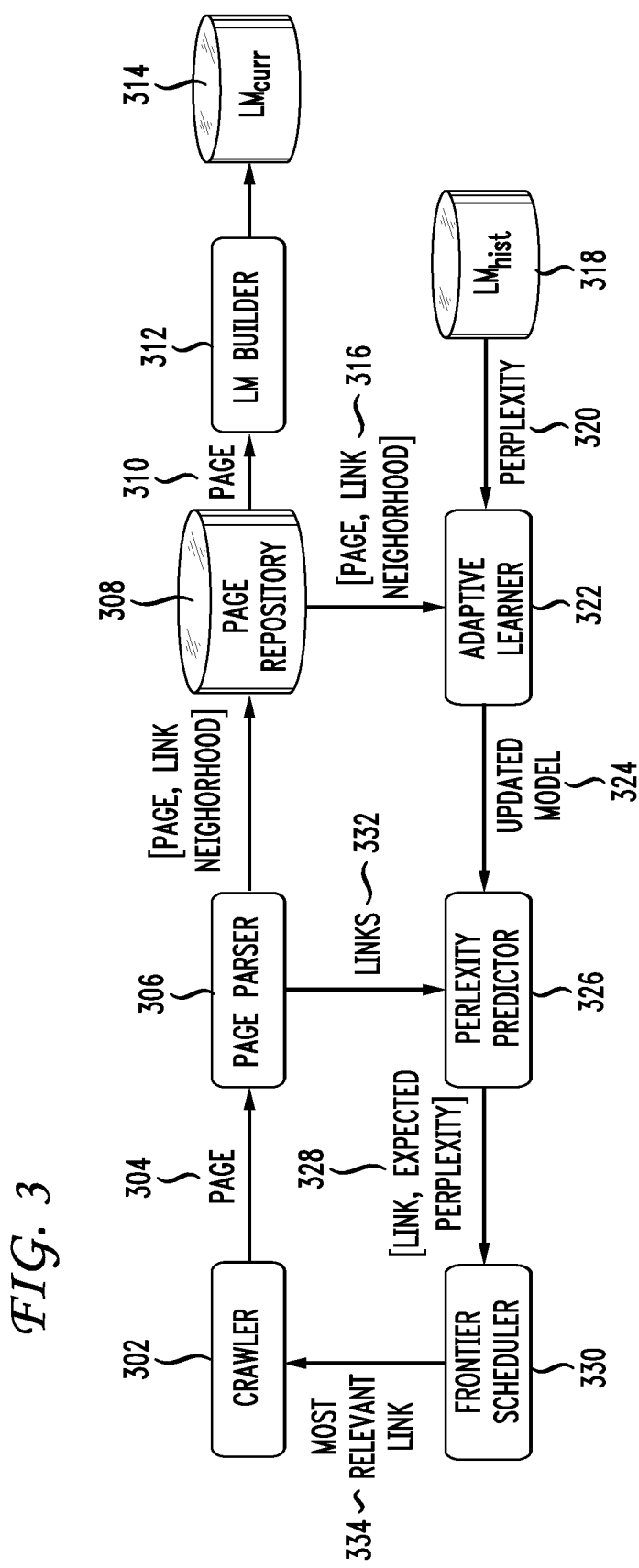
FIG. 3 illustrates an example crawler architecture.

FIG. 3 illustrates an example architecture of a crawler 300. $LM_{hist}$ 318 is the language model from one or more previous crawls and $LM_{curr}$ 314 is the language model to be created from the current cycle's crawl. The crawler 300 uses the Perplexity Predictor 326 to guide its visitation policy by predicting the expected perplexity with respect to $LM_{hist}$ 318 of a page given its link. The Perplexity Predictor 326 sends its prediction 328 to the Frontier Scheduler 330, which then decides the next or most relevant link 334 to be visited by the crawler 302. The Page Parser 306 parses the page 304 to extract links 332. The downloaded pages 304 are then stored in the Page Repository 308. The Page Repository 308 passes pages 310 to the LM Builder 312 to create the new language model, $LM_{curr}$ 314.

In the next cycle, $LM_{curr}$ 314 replaces $LM_{hist}$ 318. Because the language model changes every cycle, the Adaptive Learner 322 adapt the visitation policy accordingly by creating a new or updated model 324 for the Perplexity Predictor 326 as the crawl progresses based on perplexity information 220 received from $LM_{hist}$ 318 and on the pages/links 304, 332, 316 collected in the current crawl. These components are described in more detail below.

With respect to the Perplexity Predictor 326, in order to create diverse language models, the crawler 300 focuses on novelty regions for $LM_{hist}$ 318. The novelty regions can be modeled as regions that contain pages with high perplexity values over $LM_{hist}$ 318. To guide the crawler visitation policy to these regions, the crawler relies on the links to pages in these regions. In contrast with known approaches which try to focus the crawler on a particular topic, the Perplexity Predictor 322 deemphasizes the pages previously covered, based on an objective to increase the diversity of the language model.

Formally, let $P=p_1, \ldots, p_{|P|}$ be the pool of |P| pages and $N=n_1, \ldots, n_{|P|}$ be the neighborhoods of the links pointing to these pages. The link neighborhood includes the words in the anchor of the link, words around the link out to a threshold, such as 10 words before and after the anchor, and/or words the link URL. Equation (5), shown below, illustrates an ideal VP to visit with the k-best pages with the highest perplexity according to $LM_{hist}$ 318. However, this involves crawling all the pages and evaluating the perplexity of the text on each page, which can be an expensive operation. Rather, the system can estimate the perplexity of the text on a page without crawling it, as shown below:

$$VP = \arg\max_{P_i}^{(k)} \text{Perplexity}(LM_{hist}, p_i) \quad (5)$$

The system can estimate perplexity based on an assumption that the text in the neighborhood of the link that points to the page has some predictive power about the perplexity of the linked page. The link neighborhood can contain information that indicates the content of the page. This indication can be operate at a number of different levels. Certain links may contain no indication of the page's content, when its link neighborhood is empty or just contains non-descriptive words. A broad indication, for instance, that a URL containing the term "sports" probably has content about sports in its body but just inspecting it, it is not clear which topic within sports that page discusses. A more descriptive indication of the page's content, for instance, a URL with the string "yankees-clinch-playoff-berth-beat-blue-jays" indicates that its content is about the baseball teams Yankees and Blue Jays, and their participation in playoffs. This approach can be particularly effective in crawling news sites, blogs, editorials, and similar web sites which include significant human-readable information in URLs.

Estimating the perplexity of a page based on the neighborhood of a page is a regression problem with the text features of the neighborhood serving as the independent variables. However, since this is a very noisy and sparse problem, and the exact perplexity is not necessary when an approximation of the real value can suffice for the crawling schedule, the system can aggregate links with similar perplexity values in the same class. To make the perplexity values more discrete, the system can use an equal-frequency binning approach to avoid the problem of having imbalanced training data. Experimental data have shown that one suitable number of bins is three, but other numbers of bins can be used. As the overall distribution of perplexity values changes over time, its distribution within each bin also changes.

Figure 4:
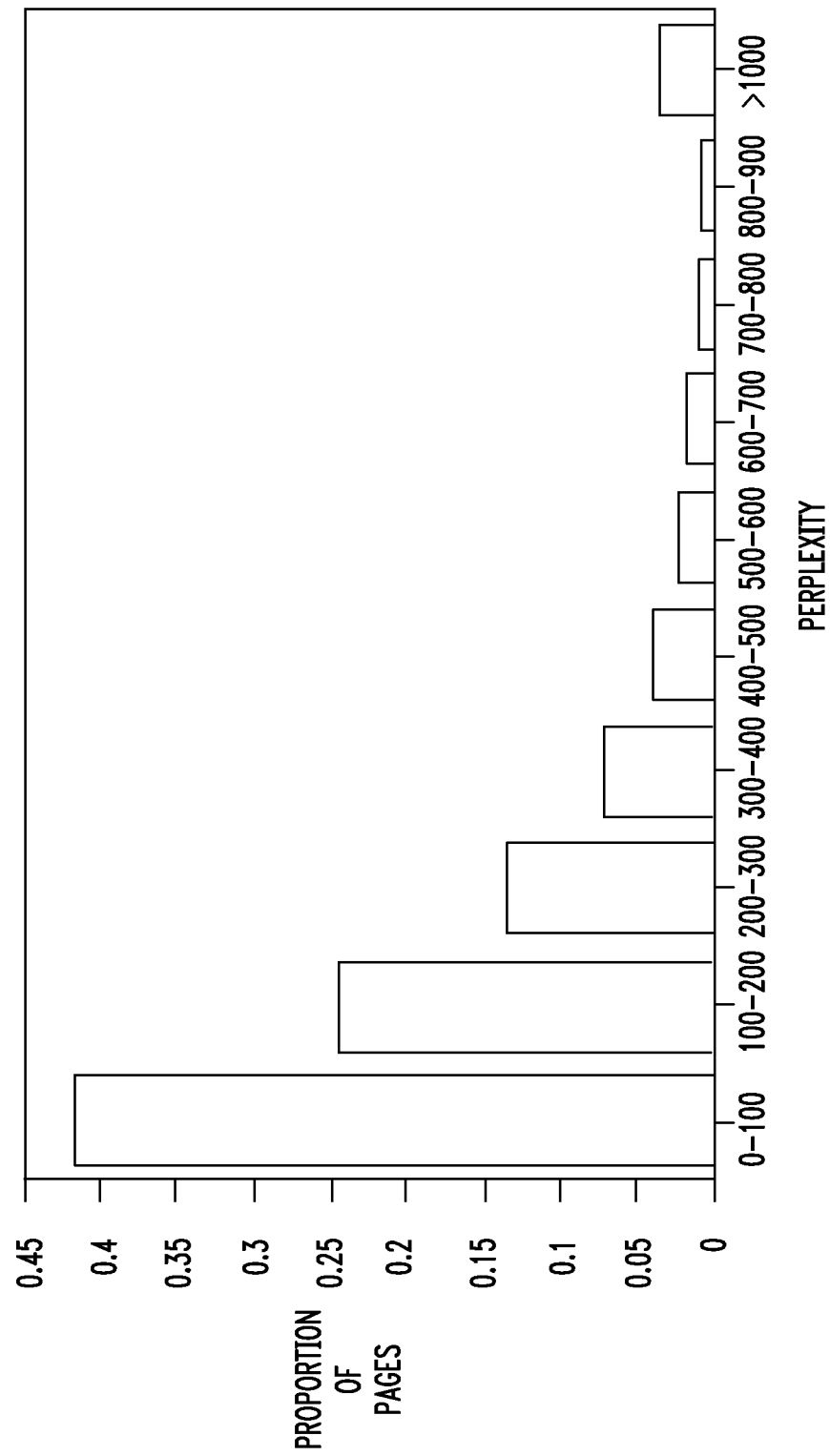
FIG. 4 illustrates an example distribution of perplexity values from a random crawl.

To better illustrate the distribution of perplexity values in this task, in FIG. 4 illustrates a distribution of the perplexity of pages from a random crawl of 100,000 pages at time $t_1$ from news sites over a language model created in a previous day ($LM_0$) composed by 100,000 pages collected using the same strategy on these sites. The perplexity is skewed towards small values. For 40% of the pages the perplexity is between 0 and 100, and the higher the perplexity value, the smaller the number of pages. This distribution varies over time, skewing more towards small values, which makes the problem of finding high perplexity pages much harder.

Thus, given the text neighborhood the Perplexity Predictor classifies $n_i$ into a particular perplexity class c using the features ($\phi$) computed from the text of the neighborhood as shown in Equation 6:

$$c_i^* = \arg\max_c P(c|\phi(n_i)) \quad (6)$$

Three different exemplary algorithms can be used for text classification: Naïve Bayes, Support Vector Machines (SVM) and Maximum Entropy (MaxEnt). Other suitable algorithms can be used as well. From the $t_1$ crawl used in the previously presented perplexity distribution experiment, the training data was prepared by randomly selecting 48,000 links and a different set of 12,000 links as a testing set and, using the $LM_0$ from the same experiment, the perplexity of their respective pages was calculated over $LM_0$. The experiment binned the perplexity values and trained the different classifiers and evaluated them on the test set.

Table 1, below, presents the accuracy over the three perplexity classes (Low, Medium, High) and F-measure over the class that corresponds to the highest expected perplexity values (High). The highest expected perplexity values are of the most interest, because the links in this class might point to pages that can diversify the language model. The best results in terms of accuracy were obtained by SVM and MaxEnt classifiers. SVM performed slightly better than MaxEnt for F-measure.

TABLE 1

| Algorithm | Accuracy | F-measure for High |
| --- | --- | --- |
| Naïve Bayes | 0.48 | 0.45 |
| SVM | 0.57 | 0.616 |
| Maxent | 0.57 | 0.613 |

Figure 5:
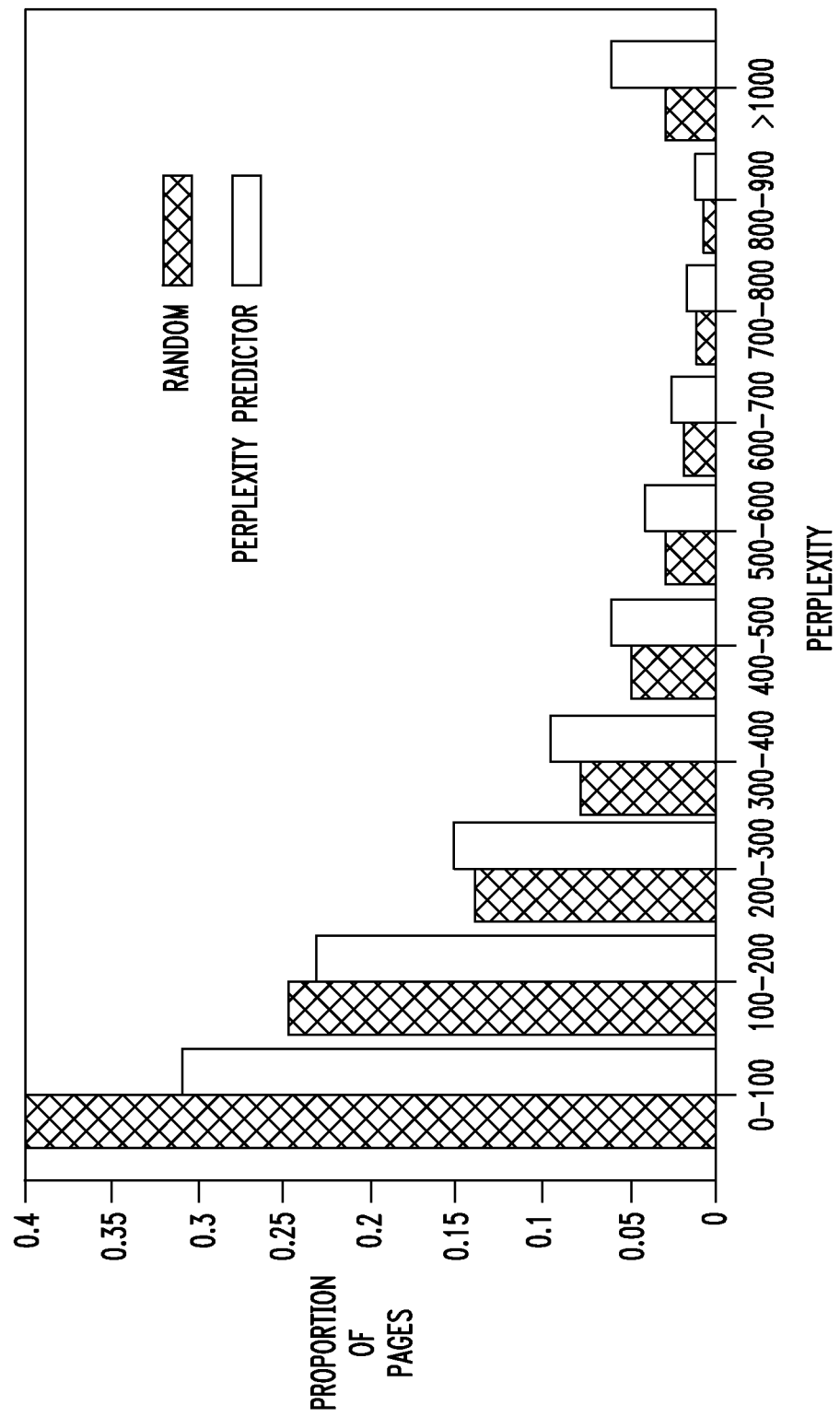
FIG. 5 illustrates a comparison of the example distribution of perplexity values from the random crawl and perplexity values from a perplexity prediction approach.

To verify whether the Perplexity Predictor based crawler performs a better job than a random crawler, the experiment included two crawls: a random crawler and a crawler guided by the Perplexity Predictor. FIG. 5 shows the percentage of pages for different values of perplexity obtained over $LM_0$. Whereas 40% of the pages collected by the random crawler is between 0-100, only 30% within this range was collected by the perplexity crawler. Moreover, the perplexity crawler was able to collect a much higher proportion of pages with perplexity greater than 200: 45% versus 35%. Overall, the average perplexity value of the pages obtained by the perplexity crawler was much higher than the one obtained by the random crawler: 361 versus 255. These numbers indicate that Perplexity Predictor is in fact able to focus the crawler on web regions that contain high perplexity pages.

Figure 6:
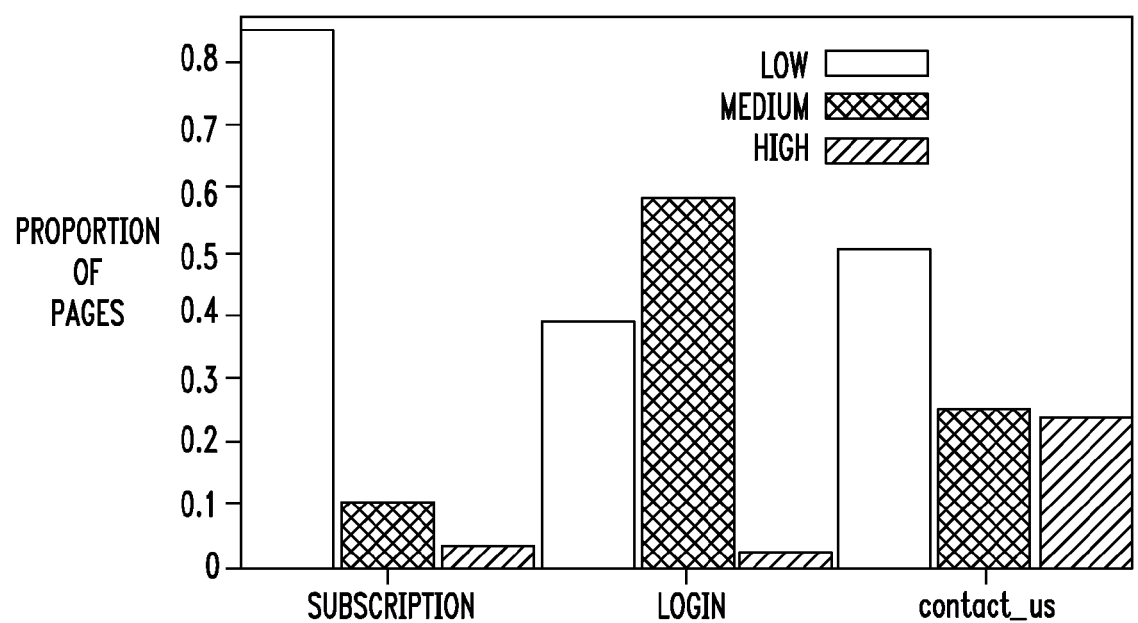
FIG. 6 illustrates an example proportion of login, subscription, and "contact us" pages in three different perplexity classes.

The Perplexity Predictor's effectiveness is driven by the ability to capture the link patterns of stale pages from web site sections whose vocabulary is similar across sites as, e.g., login, subscription and obituary pages. To give a concrete example of this, the experiment looked at the distribution of login, "contact us" and subscription pages over the perplexity classes. More specifically, for each class (0,1,2), the Perplexity Predictor classified 3,500 links, the results of which are plotted in FIG. 6, illustrating the proportion of links of such pages in each set. FIG. 6 shows that most of the links to these types of pages were classified as having low perplexity. In fact, looking at features with high information gain in this classification task, patterns in the links as login, log, sign, obituary have high values of information gain.

The disclosure now turns to a discussion of the Frontier Scheduler 330 of FIG. 3. Having identified the links to crawl using the Perplexity Predictor, the Frontier Scheduler schedules the next link to be visited by the crawler. The Frontier Scheduler bases the schedule for visitation on expected perplexity of the links available in the frontier and on other visitation policies, for example, to avoid hitting a same web server in a short period.

The Frontier Scheduler can be implemented as a set of N queues, each queue corresponding to a Perplexity Predictor class. Within a queue, links are ordered based on their likelihood of belonging to the class associated with the queue. The queue from the highest perplexity class contains more elements than the other ones. In experimental data, the proportion of the queue sizes was 1 (low), 2 (medium), 10 (high).

As the accuracy of the Perplexity Predictor is far from perfect and also to avoid some possible bias contained in the links that might hurt the diversity of the crawl, the crawling frontier can be updated in batches, an example set of steps is provided. When the crawler starts, all seeds are placed in queue 1. At each step, the crawler selects the link with the highest relevance score from the first nonempty queue. When a page is downloaded, its links are extracted and added to a separate persistent frontier according to the prediction of the Perplexity Predictor. Only when the queues in the crawling frontier become empty, the crawler loads the queues from the persistent frontier.

The disclosure turns to the LM Builder 312 of FIG. 3. After the crawler finishes its daily cycle, the LM Builder 312 creates a language model from the crawled pages, as shown in Algorithm 1, below:

---
Algorithm 1:
---
```
1:    Input: N
{N: number of language models to be merged.}
2:        predictorLMs = ;
3:        loop
4:            Input: webPages, devSet
{webPages: web pages from today's crawl,
devSet: development set.}
5:            sents = ParsePages(webPages)
{Parse the web pages into sentences.}
6:            lm_n = CreateLM(sents)
{Create today's LM from sentences.}
7:            currentLM = CombineLMs(predictorLMs, lm_n, devSet)
{Combine language models used by the predictorLMs and today's LM.}
8:            predictorLMs = SelectLMs(devSet, N)
{Select the best LMs from history and combine them.}
9:        end loop
10:    Output: predictorLM, currentLM
```
---

First, the algorithm parses the web pages downloaded by the crawler in the Page Repository into sentences. One way to parse web pages is to break down the documents based on the HTML tags that correspond to the newline characters: <p>, <dt>, <dd>, <tr>, <li>, <br> and all header tags such as <h1>, <h2>, etc. The algorithm can parse web pages beyond just HTML, such as parsing RSS feeds, JSON queries, XML, JavaScript, Flash, or metadata. After removing all of the HTML tags or otherwise parsing the web page, the system considers the pieces of text located between these special tokens as sentences. The system can remove all the punctuation and special characters. If the documents are not HTML based documents, the algorithm can be modified to parse those documents according to their particular formats and data structures.

The next step is to create a language model from these sentences. The system can build trigram models from these sentences. A trigram model was used for all the experiments presented herein. The trigram model can be built using a language modeling toolkit, with a back-off scheme (such as the Katz back-off scheme) for the n-grams not observed in the training corpus. A weighted finite-state acceptor can represent the resulting model and evaluate the perplexity of a given input sentence.

The system can merge the resulting language model with language models created in previous cycles. Under ideal circumstances, the system would merge an infinite number of language models, but in practice, hardware, software, and memory restrictions can limit the total number of language models to be merged. First, the length of the merging process directly correlates to the number of models. So as the number of models increases, so does the length of the merging process. When dealing with newscast information in particular, the length of the merging process can be an issue because newscast information is very time sensitive, so an up-to-date LM should be used for the word prediction. Spending days to merge models may not be useful in practice. Second, a higher the number of models leads to a longer perplexity computation, because its calculation time is dependent on the size of the LM. The crawler needs to calculate page perplexity just crawled over on the fly in order to guide its policy according to the current LM. Large perplexity calculation times cause the online learning to be prohibitive. Balancing these factors, the system can limit the number of models to merge. Considering the news stories have some kind of decay factor over time, one simple approach considers only the n previous models to merge, because stories that are too old have less impact in current news. This, however, may not work well for all situations because language models from the past can influence how language models are built in present. Thus, for instance, the language model from the first cycle has a greater influence over stories in many cycles ahead than language models built without this dependency.

One solution to this problem is to limit the total number of language models to merge by choosing the k most suitable language models from the pool of previous language models. Given a set of language models LM={$LM_1, \ldots, LM_n$}, the objective is to provide a weighted interpolation of the language model as shown in equation 7, below. The system can estimate the weights in this equation using an Expectation-Maximization algorithm to minimize the perplexity of a tuning set of sentences.

$$LM_{merged} = \sum_{i=1}^{n} w_i * LM_i \qquad (7)$$

The development set should reflect current news stories; otherwise it would give higher weights to a model built in the past that does not have much influence in the present. The initial pages from the news web sites usually contain the most up-to-date information in the site and a good summary of the current main stories. For this reason, the development set can be a subset of the initial pages of the news sites. This sample may or may not be used in the corpus that creates the language model. Thus, the set of k selected language models can be merged using the development set to set their weights (predictorLM) and used by the crawler for the next crawl cycle. After the next cycle, the LM generated from the crawl is added to predictorLM using interpolation creating the LM for the current word prediction (currentLM). Finally, a new predictorLM is created from the current pool of language models for the next cycle.

The disclosure will now discuss the adaptive learner 322 as shown in FIG. 3. After every crawl the system can build a language model, the predictorLM, to guide the crawler policy in the next crawling cycle by updating the Perplexity Predictor according to the new predictorLM. The Perplexity Predictor matches patterns in the links to pages (link neighborhood) with perplexity values from a language model to obtain link neighborhood->perplexity information from the current crawl. When dealing with a dynamic environment such as new stories (patterns) constantly arising, the patterns of the links used by the Perplexity Predictor operate best when they are up-to-date. That is why patterns in the links of the current crawl can be used and, as a result, this process should be performed on the fly. The Adaptive Learner updates the Perplexity Predictor as outlined in Algorithm 2, below ---
Algorithm 2:
---
```
1:    linkPolicy = random
{Initially the crawler uses a random visitation policy.}
2:    loop
3:        Input: pages, links, learningThreshold
{pages:crawled pages; links:link neighborhoods associated to them;
learningThreshold:number of pages to trigger the process.}
4:        if |pages| == learningThreshold then
5:            perps = calculatePerplexity(pages)
{Calculate the perplexity of given pages.}
```

-continued

Algorithm 2:

```
6:              features = extractFeatures(links)
{Extract the features from the link neighborhoods.}
7:              perpPredictor = createPerpPredictor(features; perps)
{Create a new Perplexity Predictor from the features and perplexity
of the pages.}
8:              linkPolicy = updatePolicy(perpPredictor)
{Update the crawling policy with the new Perplexity Predictor.}
9:              updateFrontier(perpPredictor)
{Update the expected perplexity of the links in the frontier.}
10:     end if
11:     end loop
```

Initially, the crawler starts with a random link visitation policy, since it does not know a good strategy to follow for the new language model, predictorLM. After a specified number of crawled pages, the system performs a learning iteration by collecting, for each page p, the link neighborhood of the links that point to p, and the perplexity of p over predictorLM, to generate training data. Then, the system creates a new Perplexity Predictor, updating the crawler's link policy. As the last step, the Adaptive Learner updates the values of expected perplexity of the current links in the frontier based on the new Perplexity Predictor. The system can invoke the Adaptive Learner periodically, when the crawler visits a pre-determined number of pages.

The disclosure now turns to a discussion of experimental evaluation. The experimental evaluation assesses the disclosed crawling strategy to create high-quality and more diverse language models by evaluating its overall performance on newscast data during a certain period of time. The experiment was set up as discussed below.

The language models' corpus was compiled from web pages crawled from a list of 4,874 news web sites. One goal of the experiment was to create generic language models, so the news web sites covered a great variety of web sites, local, national and international news, as well as news from different topics: business, sports, technology, student life, etc.

The experimental system used two different crawling strategies to create the corpus for the language models, a random crawl and a diversity crawl. The random crawler is the baseline approach and randomly selects the next link to be visited by the crawler. From the corpus generated by this crawler, language models were composed in two different ways. The first way is a single language model from the current crawl, denoted as Random Crawler (Single). The second way is a language model created by the combination of the LM of the current crawl with previous language models generated by this crawler, denoted as Random Crawler(Merged). The Diversity Crawler uses perplexity to guide the crawler's policy. The diversity crawler starts with a random policy. The Adaptive Learner in this experiment created and updated the Perplexity Predictor when the crawler collected 15,000, 30,000 and 50,000 pages. Similar to the Random Crawler, two different language models were composed: a single language model from the current crawl, denoted as Diversity Crawler (Single), and a combination of the current LM with previous language models produced by this crawler, denoted as Diversity Crawler (Merged).

In this experiment, each crawling cycle was one day long. Thus, the two crawlers ran every day during 23 days of October 2010. Each crawler collected a total of 100,000 pages, generating a corpus of about 8 million sentences, on average. Initially, a random crawl was performed to create the initial LM (day 0), and was used by the Diversity Crawler to define its policy in the next cycles. A window of eight days was used to interpolate the language models.

One common way to evaluate language models is by calculating its perplexity over a test corpus. Because speech recognition is a possible task that would benefit from the language models created in the newscast domain, in this experimental evaluation, audio transcripts are used to assess the overall performance of the different approaches. For this purpose, daily transcripts of TV and radio programs were collected from three web sources: CNN: cnn.com provides an archive of transcripts of their TV shows as well as of some CNN international and HLN programs; NPR3: NPR makes available an API that can be used to retrieve audio and transcripts for their main programs (these programs cover a broad range of topics: politics, economy, sports, etc.); Livedash: Livedash.com is a website in which the user can search over the transcripts of TV shows as well as read the actual transcripts of these shows (this source provided transcripts from a total of 21 programs in different topics such as sports (e.g. ESPN), business (e.g. CNBC) and general news (e.g. MSNBC, Fox News)).

In order to build broad-domain language models, the experiments attempted to cover as many different transcripts as possible to evaluate the approaches. It must be noted that, as some programs are aired only on weekdays and others only on weekends, the total number of transcripts available vary over time.

Figure 7:
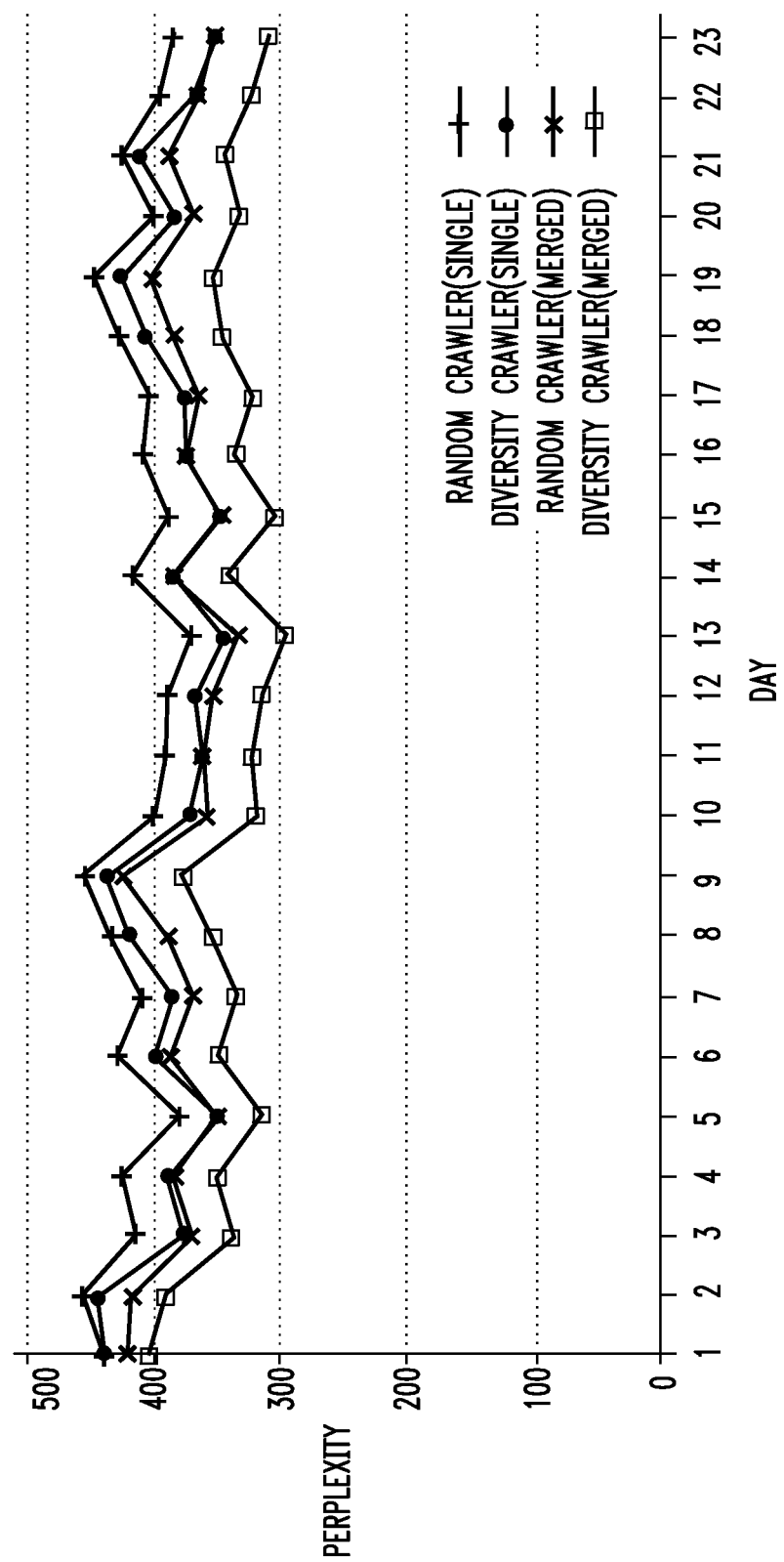
FIG. 7 illustrates sample perplexity from a four language model configuration over a corpus.

The disclosure now discusses assessing the diversity crawler. FIG. 7 presents the perplexity obtained by the 4 different LM configurations over the daily transcripts. The first thing to note is that the Diversity Crawler(Merged) got the lowest perplexity values on all days of the experiment, followed by Random Crawler(Merged), Diversity Crawler (Single) and Random Crawler(Single). These numbers confirm that the crawling approach disclosed herein combined with the model merging is in fact effective in building more fresh and diverse language models. In addition to that, the Diversity Crawler(Single) outperforms the Random Crawler (Single) in all days. This means that, by only using the LM of the day's crawl, the diversity crawler detects more novelty on the LM than the Random Crawler. The diversity crawler does so by avoiding pages whose vocabulary already appeared in the past, or is not useful for the day's news as, for instance, stale pages in the websites (e.g. "contact us", "about", etc.). Another interesting result from these numbers is that the Diversity Crawler(Single), which only uses the current LM produced by the Diversity Crawler, had a performance close to the Random Crawler (Merged) and, on some days, almost the same (e.g. days 3, 15 and 23). Recall that the Random Crawler (Merged) uses around 800,000 pages in its corpus whereas Diversity Crawler(Single) only uses 100,000. In terms of numbers of tokens contained in the LM, the LM of Diversity Crawler(Single) is usually less than half of the Random Crawler (Merged).

Figure 8:
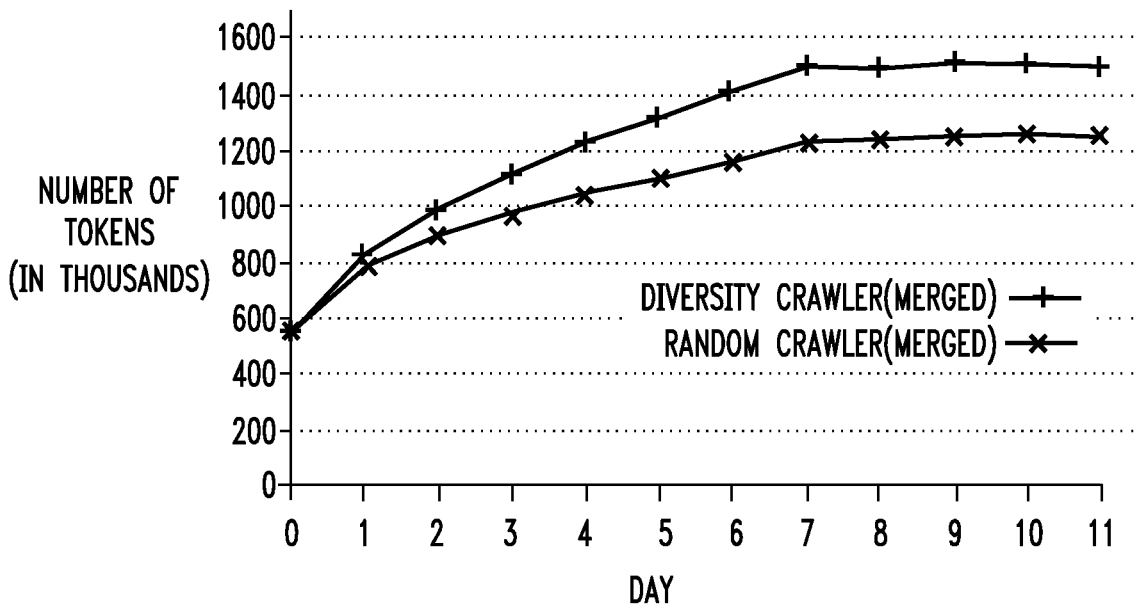
FIG. 8 illustrates example sizes of language models generated by merging data collected over several days.

With regard to the changing behavior of these configurations over time, they presented similar trends, as shown in FIG. 8. These trends are mostly influenced by the performance of the LM of the day. Initially, the difference of performance between Diversity Crawler (Merged) and Random Crawler (Merged) increases for the first eight days, which is the size of the window of the model merging. This occurs because on each day, the Diversity Crawler generates a much fresher and more diverse LM. This can clearly be seen by looking at the size of the language models produced by each crawling strategy with merging. FIG. 8 depicts the number of tokens that composes the merged language models each day for the first twelve days (after this period their size did not change much). At the beginning, both approaches started from the same LM, i.e., the language model created on the first day by running a Random Crawler. However, at each day, the Diversity Crawler (Merged) obtained much more new tokens than the Random Crawler. Since both approaches crawled the same number of pages, this increased difference of LMs sizes suggests that the vocabulary of the pages collected by the Random Crawler has a greater overlap with previous crawls than for the Diversity Crawler. This confirms that the Diversity Crawler is in fact able to produce more diverse language models. After the day 7-10, when the number of language models are fixed to eight, the difference of language models' sizes fluctuates within a small interval, since their sizes did not change much. An interesting observation from these numbers is that an LM created by the Random Crawler (Merged) with eight models (e.g., day 7) has similar size than an LM with only five models (e.g. day 4) created by the Diversity Crawler(Merged).

Figure 9:
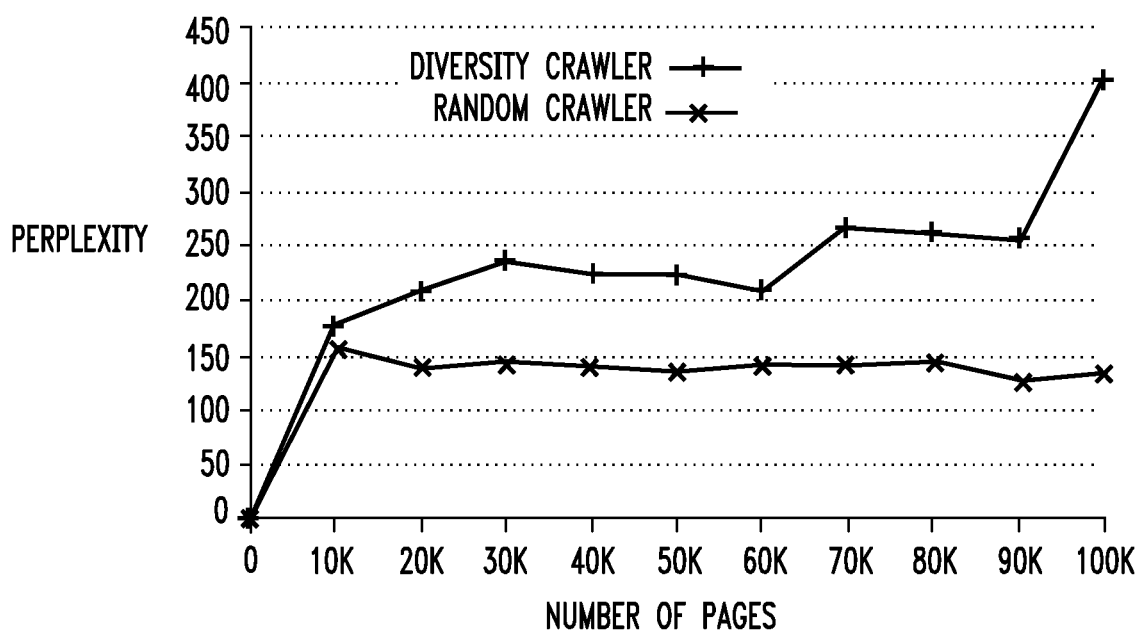
FIG. 9 illustrates an example average perplexity from a diversity crawler and a random crawler during a crawl cycle.

Statistics about the Diversity Crawler performance within cycles illustrate the behavior of the Diversity Crawler during each crawling cycle and to show the dynamic nature of the newscasts. FIG. 9 depicts the perplexity of the pages collected by the Diversity Crawler and Random Crawler during the crawl of day 1. The perplexities of these pages were calculated over the LM of day 0 ($LM_{hist}$), and their values were averaged in intervals of 10,000 pages (0-10 k, 10 k-20 k, etc). As our goal is to obtain as diverse set of pages as possible in relation to the $LM_{hist}$, the higher the number of high perplexity pages that were collected, the better is the performance of the crawling approach, since the crawler is filling more gaps in the LM. These numbers show that the Diversity Crawler outperforms the Random Crawler throughout the entire cycle. Moreover, the Diversity Crawler improves its performance over time, mainly because its Adaptive Learner component is able to learn on the fly the patterns of the links to high perplexity pages, whereas the performance of the Random Crawler remains almost constant.

Figure 10A:
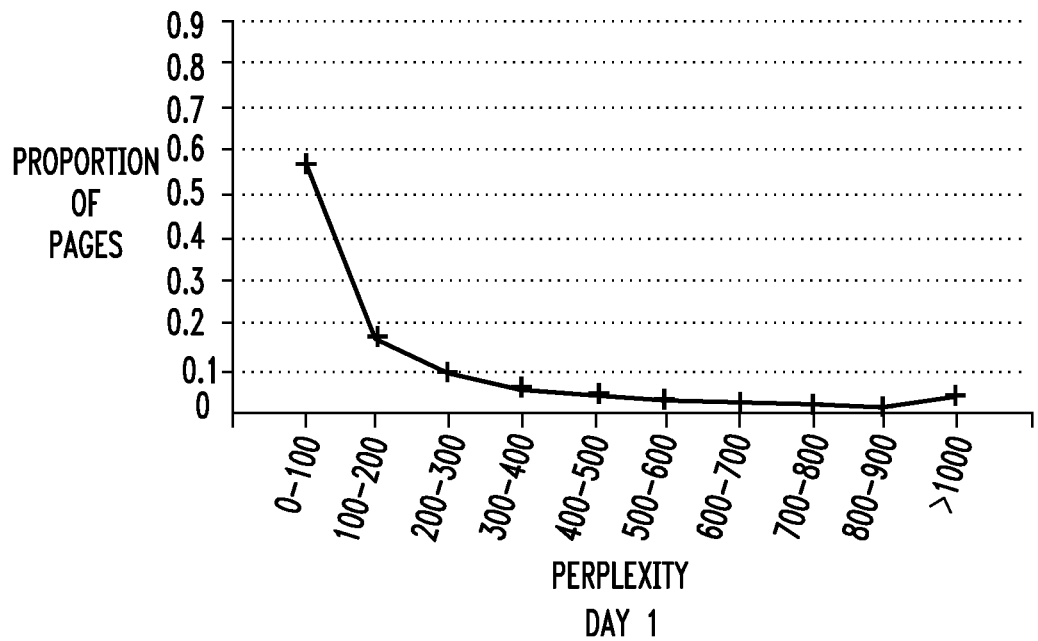
FIGS. 10A, 10B, and 10C illustrate an example evolution of a perplexity distribution.
Figure 10B:
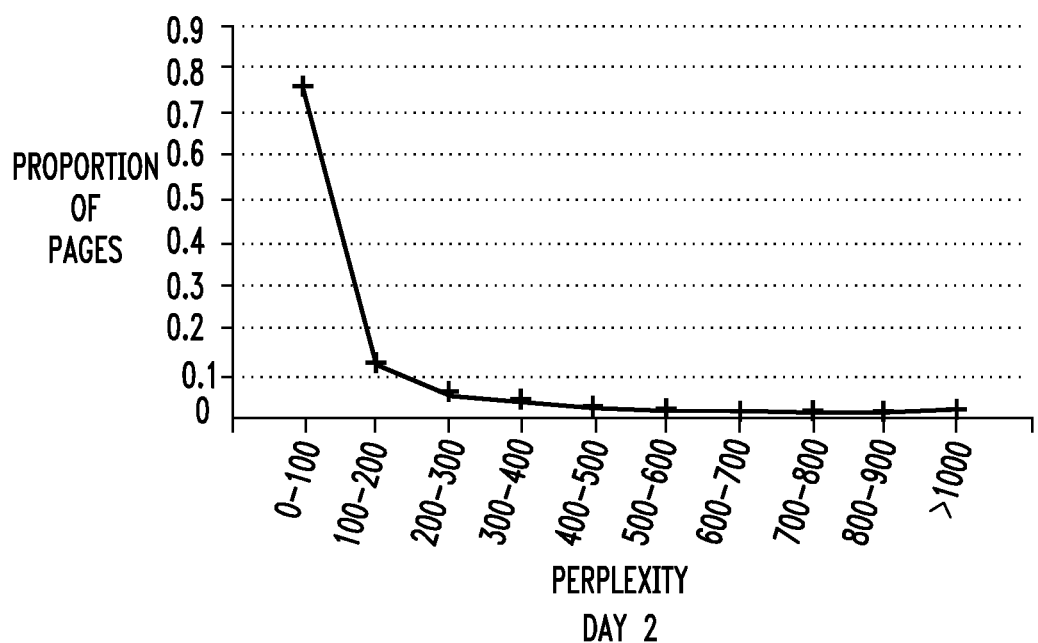
Figure 10C:
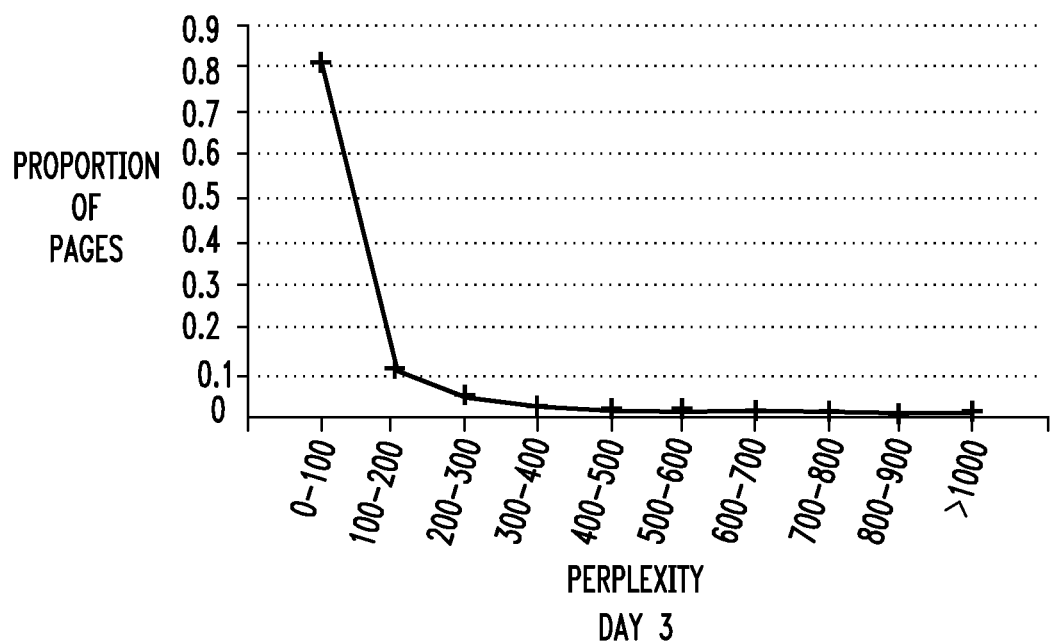
Figure 11:
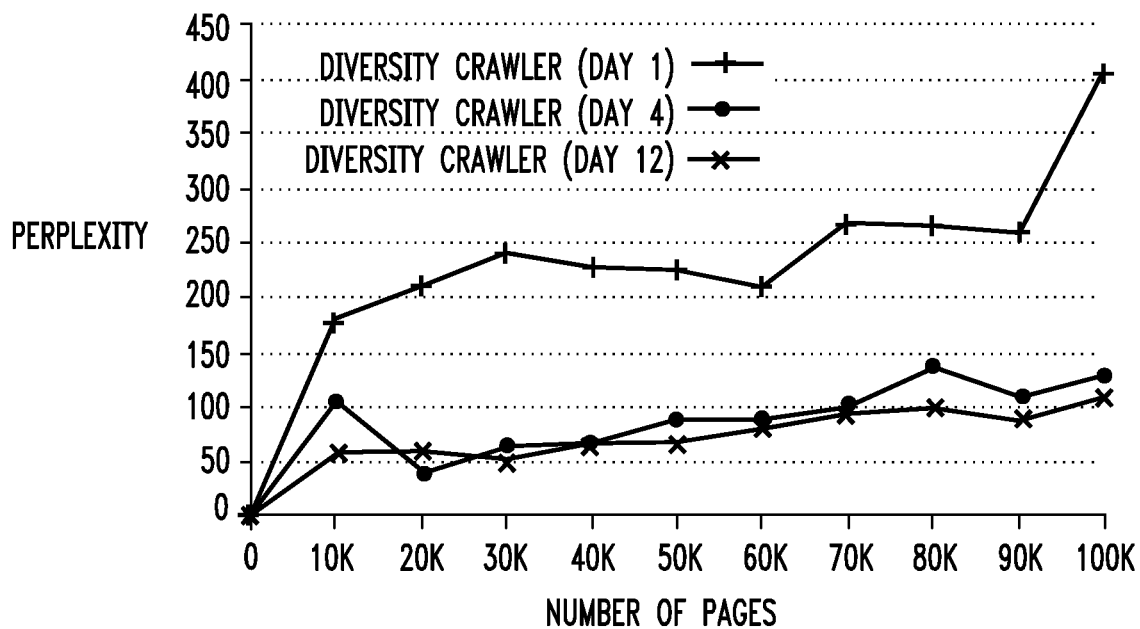
FIG. 11 illustrates an example average perplexity from three different crawling cycles.

As the Diversity Crawler fills the gaps in the language model in each new crawling cycle, fewer gaps remain to be filled which makes the problem of finding new gaps even harder. To illustrate this, FIG. 10 illustrates the overall distribution of the perplexity over the corresponding $LM_{hist}$ from pages collected by the Diversity Crawler in the first three days of the experiment. The distribution of the perplexity becomes more and more skewed towards pages with low perplexity making the problem of finding high perplexity pages harder. This is reflected in the overall crawler's performance during each cycle. FIG. 11 shows the performance over time of the Diversity Crawlers at three different days: 1, 4, 12. The crawler from the first day obtained many more high perplexity pages than the later ones. In all three crawls, the Diversity Crawler's performance improves over time because the online learning component of the crawler learns patterns in the links to the pages in the LM gaps.

Figure 12:
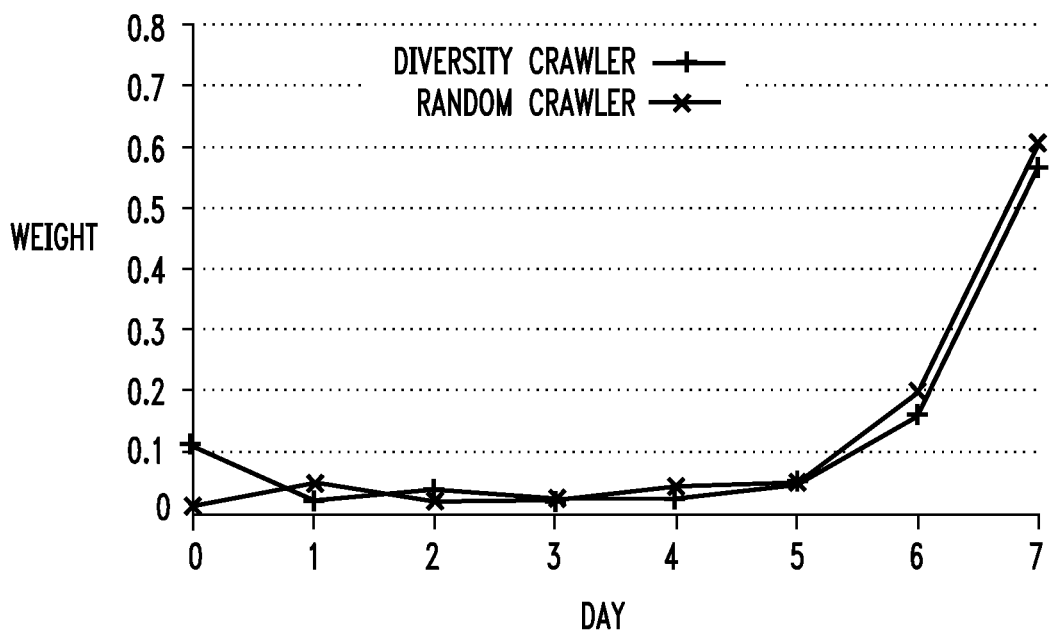
FIG. 12 illustrates example weights assigned to language models by a merging process.

The system can assign weights to different models by interpolation. FIG. 12 shows these weights for the Random and Diversity Crawlers in the first eight days of the experiment. Both curves indicate a decay factor over time because the data is time-sensitive. However, the weights assigned to the more recent models in the Random Crawler are much higher than the ones assigned to the models created by the Diversity Crawler. Furthermore, the first LM in the Diversity Crawler interpolation has the third highest weights among the other models in this mixture, whereas in the Random Crawler interpolation the first LM has the lowest weight. These weights reflect the strategy used by each crawler to collect the data. As the Diversity Crawler's visitation policy of the current crawl is influenced by previous language models, complimentary in some sense, these language models have a higher influence over the current data and, consequently, have higher weights than the ones created by the Random Crawler, which produces independent language models. These weights are assigned by interpolation based on the development set. The exponential decay of weights indicates that this development set in fact contains up-to-date data.

Figure 13:
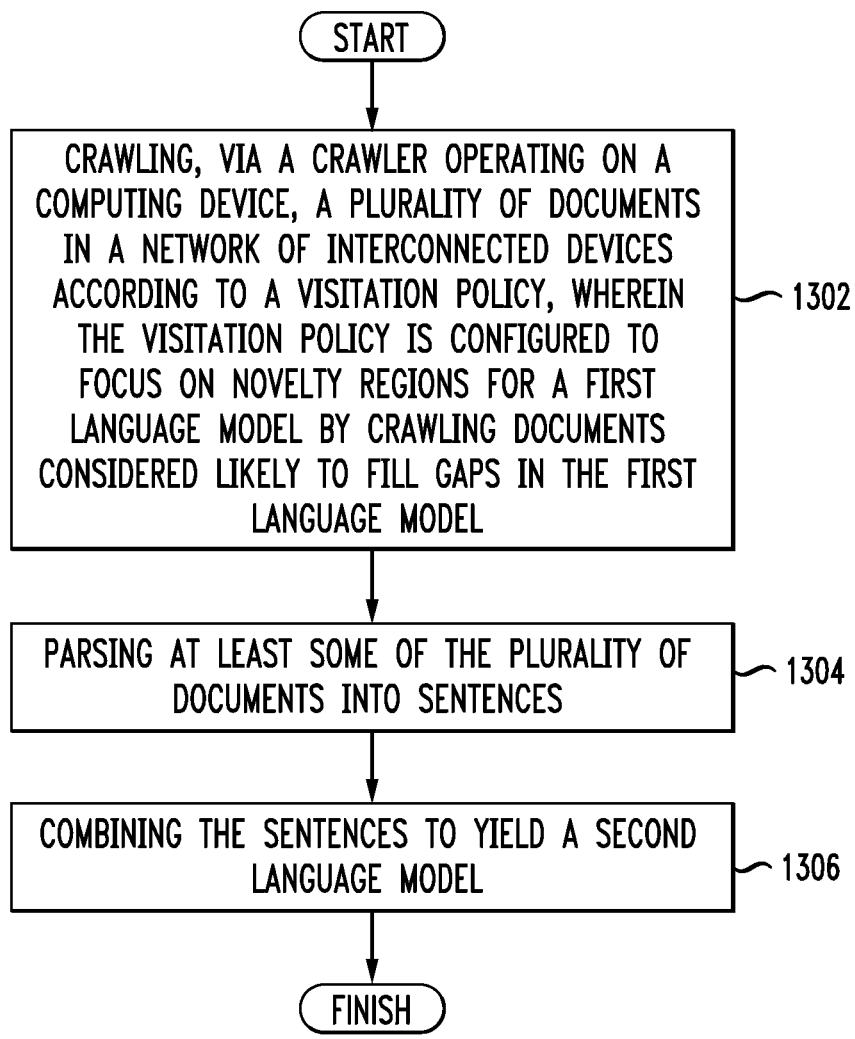
FIG. 13 illustrates an example method embodiment.

Having disclosed some basic system components, concepts, and experimental data, the disclosure now turns to the exemplary method embodiment shown in FIG. 13 for building a language model. For the sake of clarity, the method is discussed in terms of an exemplary system 100 as shown in FIG. 1 configured to practice the method. The steps outlined herein are exemplary and can be implemented in any combination thereof, including combinations that exclude, add, or modify certain steps.

The system 100 crawls, such as via a crawler operating on a computing device, a plurality of documents in a network of interconnected devices according to a visitation policy, wherein the visitation policy is configured to focus on novelty regions for a first language model by crawling documents considered likely to fill gaps in the first language model (1302). The documents can be web pages, but can also include other documents, such as word processing documents on a corporate network that contain links to other documents. The links can be contained within the displayed data of the documents or in metadata or other data not typically displayed to users. The system can identify novelty regions using an information theoretic measure. The novelty regions can be based on documents with high perplexity values over the first language model. The system can update the visitation policy for the crawler once a crawling threshold is reached, such as based on an expected perplexity value of documents. The system can determine the expected perplexity value of a page by evaluating links to the page.

The system 100 parses at least some of the plurality of documents into sentences (1304). The system can trigger parsing based on the completion of a crawling cycle, such as a specific time interval. The examples above are based on a one day crawling cycle, but longer or shorter cycles can be used. Further, the cycles can be of a dynamic duration, so that each cycle is not necessarily of the same duration. The system 100 combines the sentences to yield a second language model (1306). The second language model can be a trigram model built using a language modeling toolkit. The system can merge a set of language models to yield a combined language model.

The crawling strategy disclosed herein collects a corpus from which diverse language models are generated for the open domain of newscasts. Instead of focusing on a particular domain as regular focused crawlers, the disclosed crawler tries to diversify the language model by detecting web regions whose vocabulary is not well represented in the model, otherwise known as gaps, by identifying high perplexity pages. The crawler then learns patterns of links to high perplexity pages in order to guide its link visitation policy. In a dynamic environment such as newscasts, the crawler uses an online learning component to adapt its policy according to the current state of the environment.

Experimental evaluation shows that the Diversity Crawler is able to create more diverse and effective language models than a baseline crawler, and because the crawler is able to fill in the language model's gaps, the problem of finding gaps becomes even harder after some crawling cycles. Although the technique presented herein is discussed in terms of the open domain of newscasts, the same approach can be employed by any kind of domain in which diversity in the data is an important component. For instance, regular web crawlers can be modified to incorporate the crawling techniques disclosed herein to schedule a visitation policy to increase the diversity of the search engine index, which would be very helpful, for example, to create more diverse search results.

Embodiments within the scope of the present disclosure may also include tangible and/or non-transitory computer-readable storage media for carrying or having computer-executable instructions or data structures stored thereon. Such non-transitory computer-readable storage media can be any available media that can be accessed by a general purpose or special purpose computer, including the functional design of any special purpose processor as discussed above. By way of example, and not limitation, such non-transitory computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the disclosure may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. A method comprising:
identifying vocabulary gaps in a current language model;
establishing a visitation policy based on a previous crawling cycle and the vocabulary gaps, wherein the visitation policy identifies web pages likely to have information capable of filling the vocabulary gaps in the current language model, and wherein the visitation policy comprises a crawling schedule based on predicted perplexity of the web pages with respect to the current language model;
crawling, via a crawler operating on a computing device, the web-pages according to the crawling schedule, to yield new vocabulary words; and
generating a diverse language model based on the current language model and the new vocabulary words.

2. The method of claim 1, further comprising recognizing received speech with the diverse language model.

3. The method of claim 1, wherein the diverse language model is generated by modifying the current language model.

4. The method of claim 1, wherein the web pages are identified using an information theoretic measure.

5. The method of claim 4, wherein the web pages have high perplexity values over the current language model from a previous cycle.

6. The method of claim 1, further comprising updating the visitation policy for the crawler once a specified number of pages is crawled.

7. The method of claim 6, wherein updating the visitation policy is based on an expected perplexity value of the novelty regions.

8. The method of claim 7, wherein the expected perplexity value of a web page is determined by evaluating links to the web page.

9. The method of claim 1, further comprising merging a set of language models.

10. A system comprising:
a processor; and
a computer-readable storage medium having instructions stored which, when executed by the processor, cause the processor to perform operations comprising:
identifying vocabulary gaps in a current language model;
establishing a visitation policy based on a previous crawling cycle and the vocabulary gaps, wherein the visitation policy identifies web pages likely to have information capable of filling the vocabulary gaps in the current language model, and wherein the visitation policy comprises a crawling schedule based on predicted perplexity of the web pages with respect to the current language model;
crawling, via a crawler operating on a computing device, web-pages according to the crawling schedule, to yield new vocabulary words; and
generating a diverse language model based on the current language model and the new vocabulary words.

11. The system of claim 10, wherein the web pages are identified using an information theoretic measure.

12. The system of claim 10, wherein the web pages have high perplexity values over the current language model from a previous cycle.

13. The system of claim 10, wherein the language model is further generated by updating the visitation policy for the crawler once a specified number of web pages is crawled.

14. The system of claim 13, wherein updating the visitation policy is based on an expected perplexity value of the web pages.

15. A computer-readable storage device having instructions stored which, when executed by a computing device, cause the computing device to perform operations comprising:
- identifying vocabulary gaps in a current language model;
- establishing a visitation policy based on a previous crawling cycle and the vocabulary gaps, wherein the visitation policy identifies web pages likely to have information capable of filling the vocabulary gaps in the current language model, and wherein the visitation policy comprises a crawling schedule based on predicted perplexity of the web pages with respect to the current language model;
- crawling, via a crawler operating on a computing device, web-pages according to the crawling schedule, to yield new vocabulary words; and
- generating a diverse language model based on the current language model and the new vocabulary words.

16. The computer-readable storage device of claim 15, the computer-readable storage device having additional instructions stored which result in operations comprising recognizing received speech with the diverse language model.

17. The computer-readable storage device of claim 15, the computer-readable storage device having additional instructions stored which result in operations comprising updating the visitation policy for the crawler once a crawling threshold is reached, wherein updating the visitation policy is based on an expected perplexity value of the web pages, and wherein the expected perplexity value of a web page is determined by evaluating links to the page.

18. The computer-readable storage device of claim 15, the computer-readable storage device having additional instructions stored which result in operations comprising merging a set of language models.

19. The computer-readable storage device of claim 15, wherein the new language model comprises a trigram model built using a language modeling toolkit.

* * * * *